(12) United States Patent
Kim et al.

(10) Patent No.: US 8,149,784 B2
(45) Date of Patent: Apr. 3, 2012

(54) BRIDGE-BASED RADIO ACCESS STATION BACKBONE NETWORK SYSTEM AND SIGNAL PROCESSING METHOD THEREFOR

(75) Inventors: Hoon Kim, Suwon-si (KR); Seong-Taek Hwang, Pyeongtaek-si (KR); Jong-Ho Yoon, Goyang-si (KR); Jae-Hun Cho, Seoul (KR)

(73) Assignees: Samsung Electronics Co., Ltd., Maetan-Dong, Yeongtong-Gu, Suwon-Si, Gyeonggi-Do (KR); Industry-University Cooperation Foundation of Korea Aerospace University, Hwajeon-Dong, Deokyang-Gu,Goyang-Si, Gyeonggi-Do (KR)

( * ) Notice: Subject to any disclaimer, the term of this patent is extended or adjusted under 35 U.S.C. 154(b) by 1000 days.

(21) Appl. No.: 11/880,659

(22) Filed: Jul. 24, 2007

(65) Prior Publication Data
US 2008/0019387 A1 Jan. 24, 2008

(30) Foreign Application Priority Data

Jul. 24, 2006 (KR) .................. 10-2006-0068828

(51) Int. Cl.
*H04W 4/00* (2009.01)
*H04L 12/28* (2006.01)

(52) U.S. Cl. ....................... 370/331; 370/401
(58) Field of Classification Search .......... None
See application file for complete search history.

(56) References Cited

U.S. PATENT DOCUMENTS

| | | | | |
|---|---|---|---|---|
| 4,706,081 A * | 11/1987 | Hart et al. ........... | 370/254 |
| 6,747,979 B1 * | 6/2004 | Banks et al. ......... | 370/401 |
| 2003/0237018 A1 * | 12/2003 | Baba ................... | 714/4 |
| 2006/0002407 A1 * | 1/2006 | Sakamoto ............ | 370/402 |
| 2006/0062187 A1 * | 3/2006 | Rune ................... | 370/338 |
| 2006/0109802 A1 * | 5/2006 | Zelig et al. .......... | 370/258 |
| 2007/0058543 A1 * | 3/2007 | Fenart et al. ........ | 370/230 |
| 2008/0049621 A1 * | 2/2008 | McGuire et al. ..... | 370/236.2 |
| 2008/0130637 A1 * | 6/2008 | Kant et al. .......... | 370/389 |

FOREIGN PATENT DOCUMENTS

KR 1997-31483 6/1997
(Continued)

OTHER PUBLICATIONS

Sakamoto, M.; Patent Application Publication No: US 2006/0002407 A1; Publication Date: Jan. 5, 2006; "Network System, Network Bridge Device, Network Management . . . ; ".

(Continued)

*Primary Examiner* — John Blanton
(74) *Attorney, Agent, or Firm* — Cha & Reiter, LLC

(57) ABSTRACT

A bridge-based RAS backbone network system and a signal processing method therefor are provided. In the bridge-based RAS backbone network system, a plurality of BSBs with Layer 2 (L2) switches are connected to a plurality of RASs, and a plurality of SCBs with L2 switches are connected to part of the BSBs in a lower layer, forming a core network. An HLR manages configuration information of network entities by storing the IP addresses and MAC addresses of MNs within the network and the addresses of SCBs to which the MNs belong in a table. Each of the SCBs statically preserves the MAC address of an external default router, for relaying an egress frame, statically registers its individual MAC address in other SCBs in the core network beforehand, detects a destination MN through the HLR, and sends a frame to the SCB of the destination MN or the MAC address of the external default router.

8 Claims, 7 Drawing Sheets

FOREIGN PATENT DOCUMENTS

| | | |
|---|---|---|
| KR | 2004-5276 | 1/2004 |
| KR | 2004-55515 | 6/2004 |
| KR | 2006-59326 | 6/2006 |
| KR | 2006-67098 | 6/2006 |
| WO | WO 97/10663 | 3/1997 |

OTHER PUBLICATIONS

Lauriol, Jean-Michel; Patent Application Publication No: US 2005/0048990 A1; Publication Date: Mar. 3, 2005; "Mobile User Location Through a WLAN;" . . . .

Tsao, Shiao-Li; Patent Application Publication No: US 2003/0169712 A1; Publication Date: Sep. 11, 2003; "Re-Allocation Method for a Distributed Ggsn System;" . . . .

Fischer, John, et al.; Patent Application Publication No: US 2004/0202199 A1; Publication Date: Oct. 14, 2004, "Address Resolution in IP Interworking Layer 2 Point-To-Point," . . . .

\* cited by examiner

US 8,149,784 B2

BRIDGE-BASED RADIO ACCESS STATION BACKBONE NETWORK SYSTEM AND SIGNAL PROCESSING METHOD THEREFOR

CLAIM OF PRIORITY

This application claims priority under 35 U.S.C. §119 to an application entitled "Bridge-Based Radio Access Station Backbone Network System and Signal Processing Method Therefor," filed in the Korean Intellectual Property Office on Jul. 24, 2006 and assigned Ser. No. 2006-68828, the contents of which are herein incorporated by reference.

BACKGROUND OF THE INVENTION

1. Field of the Invention

The present invention relates generally to Ethernet expansion, and in particular, to a bridge-based Radio Access Station (RAS) backbone network that forms the backbone of a wireless system by the Ethernet technology, and a signal processing method therefor.

2. Description of the Related Art

Ethernet is one of the most prevalent network technologies for Local Area Networks (LANs). Due to its universality and simple structure, the application of Ethernet extends its use to Very Local Area Networks (VLANs) and Wide Area Networks (WANs).

FIG. 1 illustrates the configuration of a conventional Wireless Broadband (WiBro) RAS backbone network. As shown, the WiBro RAS backbone network includes a plurality of RASs 10 and Access Control Routers (ACRs) 12 for controlling the RASs 10. The WiBro network may further include a Home Agent (HA, not shown) for supporting the Internet Protocol (IP) mobility of a Customer Equipment (CE) and an Authentication, Authorization, and Accounting (AAA) server 14 for authenticating users and CEs, verifying authorization, and billing to provide network connectivity and services to authorized users only.

Each of the RASs 10 has an allocated service area, i.e. a cell and provides services to a plurality of CEs 11, for example, portable phones, Personal Digital Assistants (PDAs), and laptops, within the cell. The RAS 10 sends and receives signals to and from the CEs 11 on radio channels. The RAS 10 is connected to an ACR 12 forming an IP subnet via a wired channel. The RAS 10 encapsulates a radio signal received from a CE 11 in an IP packet and sends the IP packet to an upper-layer ACR 12'. The ACR 12' delivers the IP packet to a neighbor ACR 12" near to a recipient by switching according to the IP address of the recipient. In this way, communications are conducted by IP packets, and the recipient is located by his IP address in the conventional RAS backbone network.

As illustrated in FIG. 1, the conventional RAS backbone network is configured mainly using Layer 3 (L3) routers. Thus, the network configuration is rather complex and its management is not efficient. Moreover, since a handover occurs in L3, the handover takes a long time.

SUMMARY OF THE INVENTION

The present invention substantially solve at least the above problems and/or disadvantages and provides additional advantages, by providing a bridge-based RAS backbone network system for facilitating a network management, enabling a faster handover, and increasing a network efficiency by use of Layer 2 (L2) Ethernet bridges, and a signal processing method therefor.

According to one aspect of the present invention, in a bridge-based RAS backbone network system, a plurality of BSBs with L2 switches are connected to a plurality of RASs. A plurality of SCBs with L2 switches are connected to a part of the BSBs in a lower layer, forming a core network. An HLR manages configuration information of network entities by storing the IP addresses and MAC addresses of MNs within the network and the addresses of SCBs to which the MNs belong in a table. Each of the SCBs statically preserves the MAC address of an external default router for relaying an egress frame, statically registers the individual MAC address of the each SCB in other SCBs in the core network beforehand, detects a destination MN that an MN within a site of the each SCB wants to communicate with through the HLR, and sends a frame to an SCB of a site to which the destination MN belongs or the MAC address of the external default router.

According to another aspect of the present invention, in a signal processing method in a bridge-based RAS backbone network system includes a plurality of BSBs with L2 switches is connected to a plurality of RASs, a plurality of SCBs with L2 switches, defining a core network, are statically aware of the locations of the SCBs in an entire network, and an HLR for managing configuration information of network entities. Upon receipt of an ARP frame requesting the address of a destination MN from an MN, a first SCB to which the MN belong queries the HLR for the address of the destination MN and acquires the address of the destination MN by a response from the HLR. The first SCB sends an ARP response to the MN, if the first SCB determines from the address of the destination MN that the destination MN is located in a site of the first SCB, so that the MN acquires the Media Access Control (MAC) address of the destination MN. The MN communicates with the destination MN through each bridge within the site.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Now, exemplary embodiments of the present invention will be described herein below with reference to the accompanying drawings. For the purposes of clarity and simplicity, wellknown functions or constructions are not described in detail as they would obscure the invention in unnecessary detail.

Compared to the conventional RAS backbone network configured using routers, the teachings of the present invention provides an inventive way to configure a RAS backbone network using Ethernet bridges so as to simplify the network configuration, facilitate the network management, and shorten the handover time by enabling a handover in Layer 2, not in Layer 3. Layer 2 uses a Media Access Control (MAC) addresses instead of IP addresses. When the IP address of a CE is known but its MAC address is not known, the MAC address is acquired by broadcasting an Address Resolution Protocol (ARP) packet in the conventional IP network. Since the ARP packet is sent not in a point-to-point manner but in a point-to-multi-point broadcasting manner, it reaches areas where it is not needed. As a result, the network efficiency is decreased. In this context, the present invention provides a network registration procedure and a communication procedure that limit the ARP broadcasting in order to increase the efficiency of the L2 network.

Figure 1:
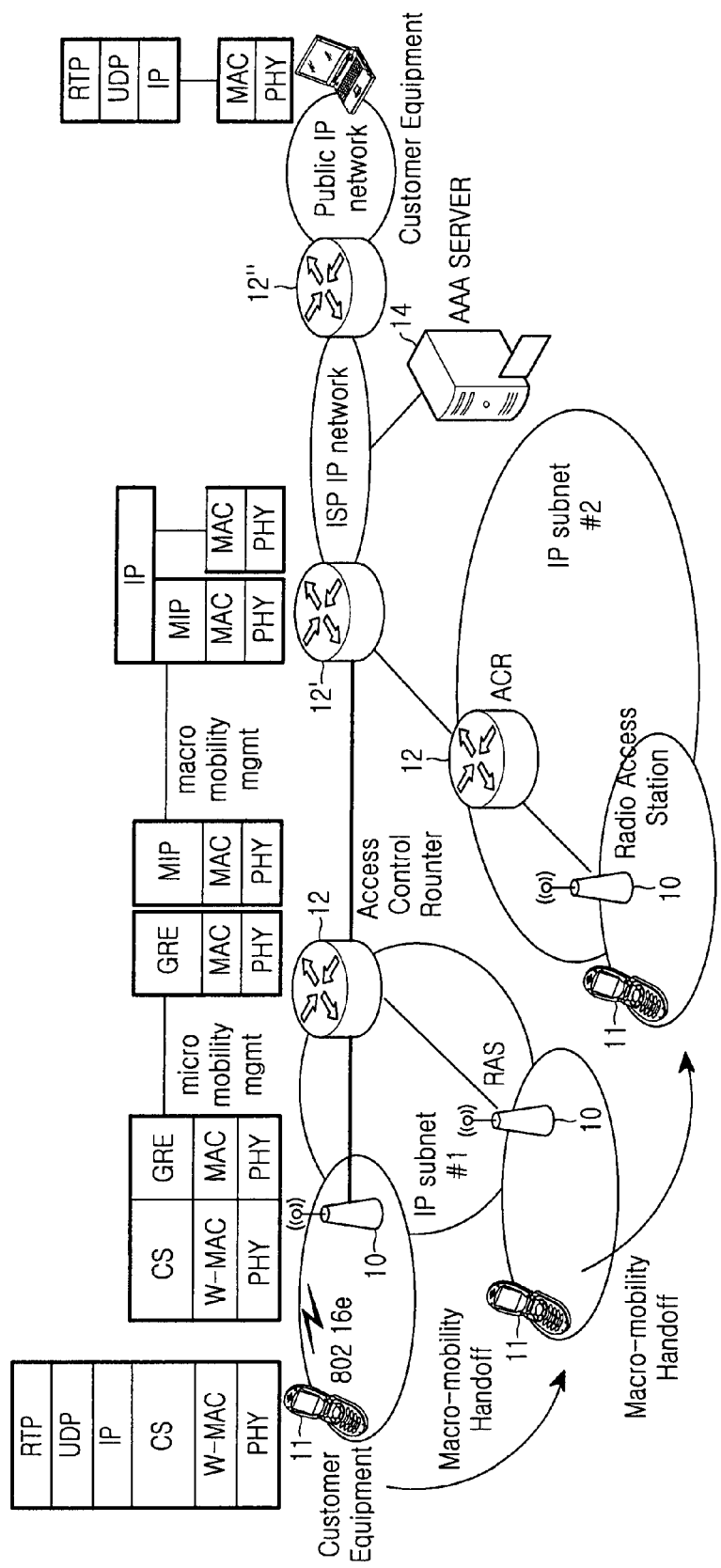
FIG. 1 illustrates the configuration of a conventional WiBro RAS backbone network.
Figure 2:
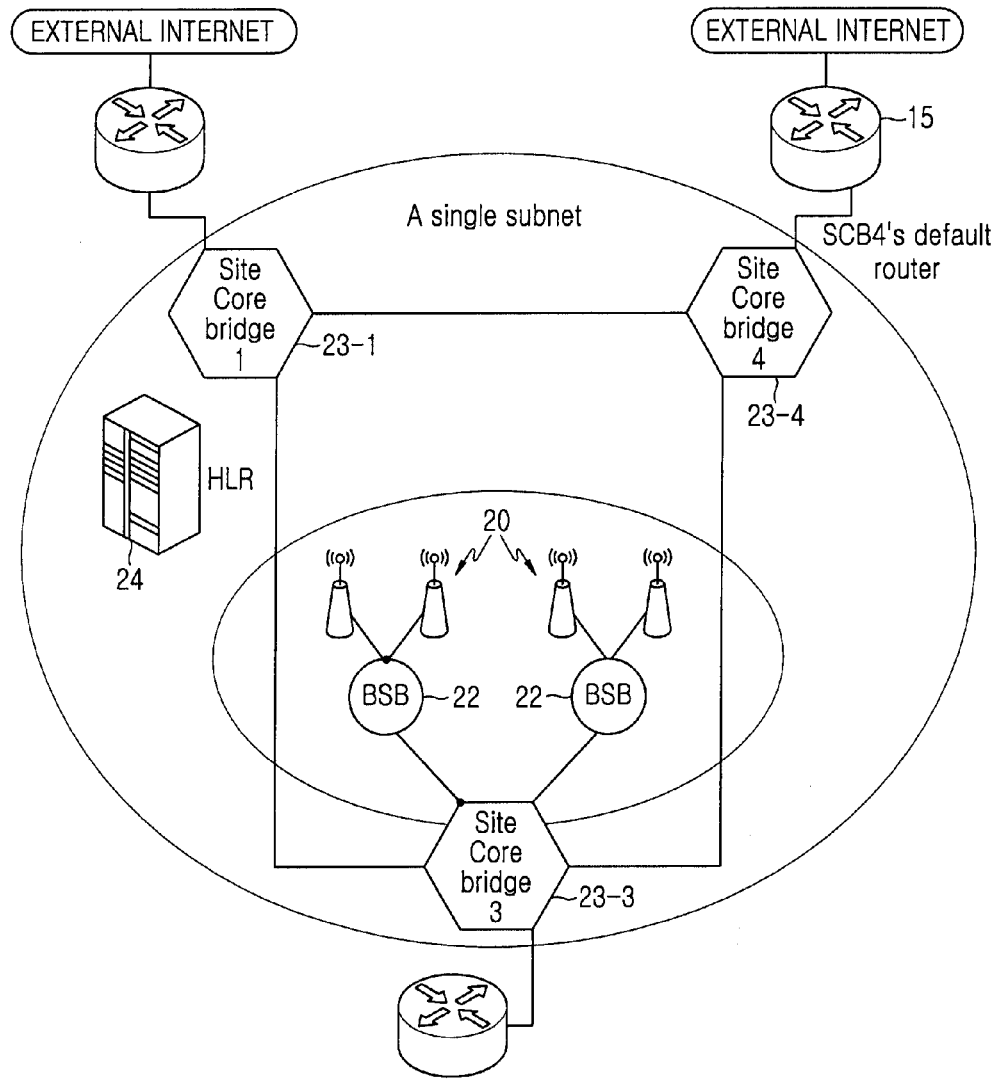
FIG. 2 illustrates the configuration of a bridge-based RAS backbone network according to an embodiment of the present invention.

FIG. 2 illustrates the configuration of a bridge-based RAS backbone network according to an embodiment of the present invention. As shown, the bridge-based RAS backbone network includes a mobile node MN (not shown), RASs 20, Base Station Bridges (BSBs) 22, Site Core Bridges (SCBs) 23-x, a Home Location Register (HLR) 24, and external default routers 15.

The BSBs 22 are bridges with L2 switches and in communication with the RASs 20. The SCBs 23-x are bridges with L2 switches, forming a core network. The HLR 24 is a server that manages the configuration information of the network entities by storing the IP addresses, MAC addresses, and SCB addresses of current active MNs in a table.

1. SCB Initialization

Referring to FIG. 2, each SCB 23-x statically preserves the MAC address of an external default router 15 connected to the SCB 23-x to relay an egress frame (a frame received at the SCB 23-x). The static setting of the MAC address of the external default router 15 in the SCB 23-x obviates the need for querying about the MAC address by an Address Resolution Protocol (ARP) frame, thereby relieving the network of ARP-incurred overhead.

The SCB 23-x statically registers its individual MAC address in other SCBs within the core network by the 802.1ak Multiple Registration Protocol (MRP). The reasons for the static registration is that SCBs form the core network of the wireless backbone network, and the core network does not change much even when there is a change in wireless cells, such as addition of a wireless cell, and that a network operator can perform the static setting without much inconvenience, thus obviating the need for address learning. In effect, each SCB has knowledge of the MAC addresses of the other SCBs in the core network.

2. Initial Registration of MN

Figure 3:
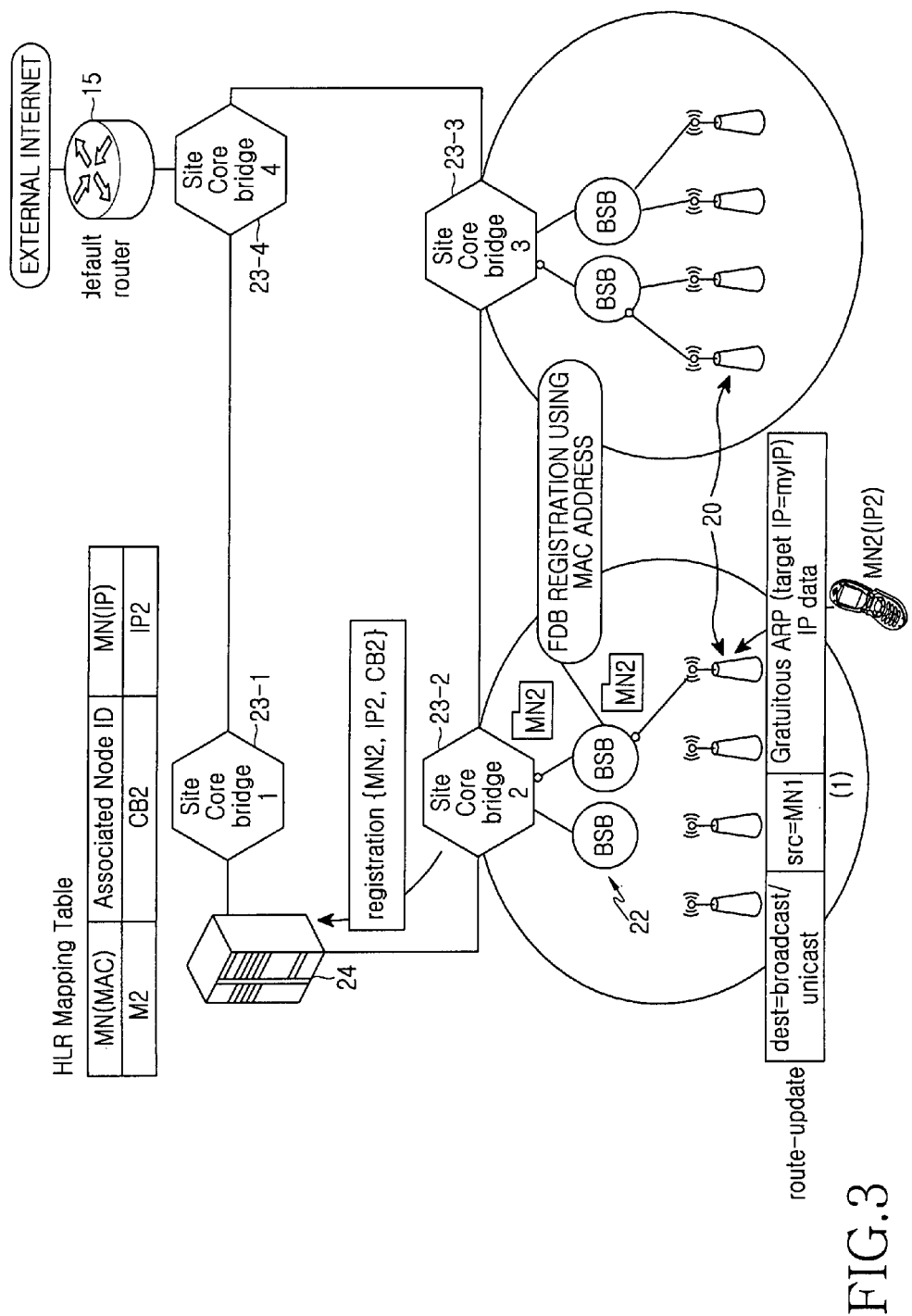
FIG. 3 illustrates a procedure for initially registering a Mobile Node (MN) to the RAS backbone network illustrated in FIG. 2.

FIG. 3 illustrates a procedure for initially registering the mobile node (MN) to the RAS backbone network illustrated in FIG. 2. Referring to FIG. 3, for initial registration to the network, each MN (MN2 herein in FIG. 3) sends a Gratuitous ARP frame with information about the MN, i.e. {MAC address, IP address} to a corresponding BSB 20, and the BSB 20 sends to an SCB 23-2 on the uplink so that MN2 can be registered in the Filtering DataBase (FDB) of each bridge (BSBs and SCBs) in the uplink path in step (1). In step (2), the SCB 23-2 sends information about MN2, i.e. {MN MAC address, MN IP address, SCB MAC address} to the HLR 24 so that the location of MN2 (i.e. the SCB to which MN2 belongs) and the information about MN2 are registered in the HLR 24.

The message for registration sent from the SCB 23-x to the HLR 24 can be a message modified for a unicast transmission from 802.1 "Registration Protocol", or a User Datagram Protocol (UDP)-based registration message. The HLR 24 maintains a table with information about MNs. The entries of the table have their lifetimes (LifeTime) and can be maintained active by periodic registration messages before expiration of their lifetimes. In the illustrated case of FIG. 3, the table lists the MAC address, associated SCB Identifier (ID), and IP address of the registration requesting MN2 as M2, CB2, and IP2, respectively.

3. Communication between MNs Within the Same Site

Figure 4:
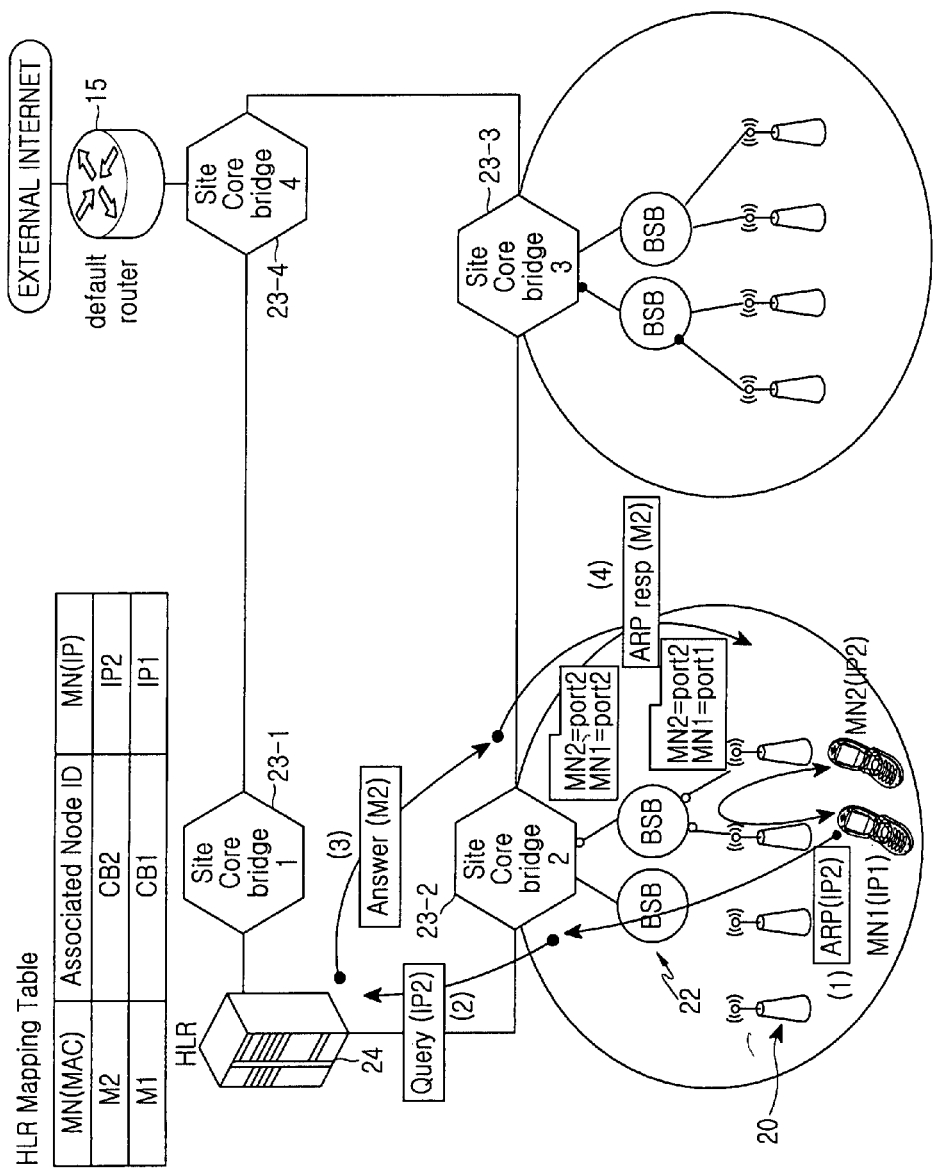
FIG. 4 illustrates a procedure for communicating between MNs within a site in the RAS backbone network illustrated in FIG. 2.

FIG. 4 illustrates a procedure for communicating between MNs within a site in the RAS backbone network illustrated in FIG. 2. The present invention defines communications between MNs within a site as communication between MNs within one SCB.

Referring to FIG. 4, to connect to a peer MN2 within the same site, MN1 sends an ARP frame requesting the MAC address of MN2 using the IP address (IP2) of MN2 in step (1). Upon receipt of the initial ARP frame from MN1, the SCB 23-2 queries the HLR 24 for the MAC address of MN2 in step (2) and acquires the MAC address of MN2 from the HLR 24 in step (3). In step (4), the SCB 23-2 sends an ARP response with the MAC address of MN2 to MN1. In step (5), a MAC frame sent from MN1 to MN2 is bridged based on the MAC address of MN2 already known to the bridges (BSB and SCB-2) within the site.

4. Communication between MNs in Different Sites

Since each SCB has knowledge of the addresses of MNs within its site only, it must determine the site of the other party and the SCB of the site to enable communications between MNs in different sites. Also, the SCB should consider the capacity of its FDB.

Figure 5:
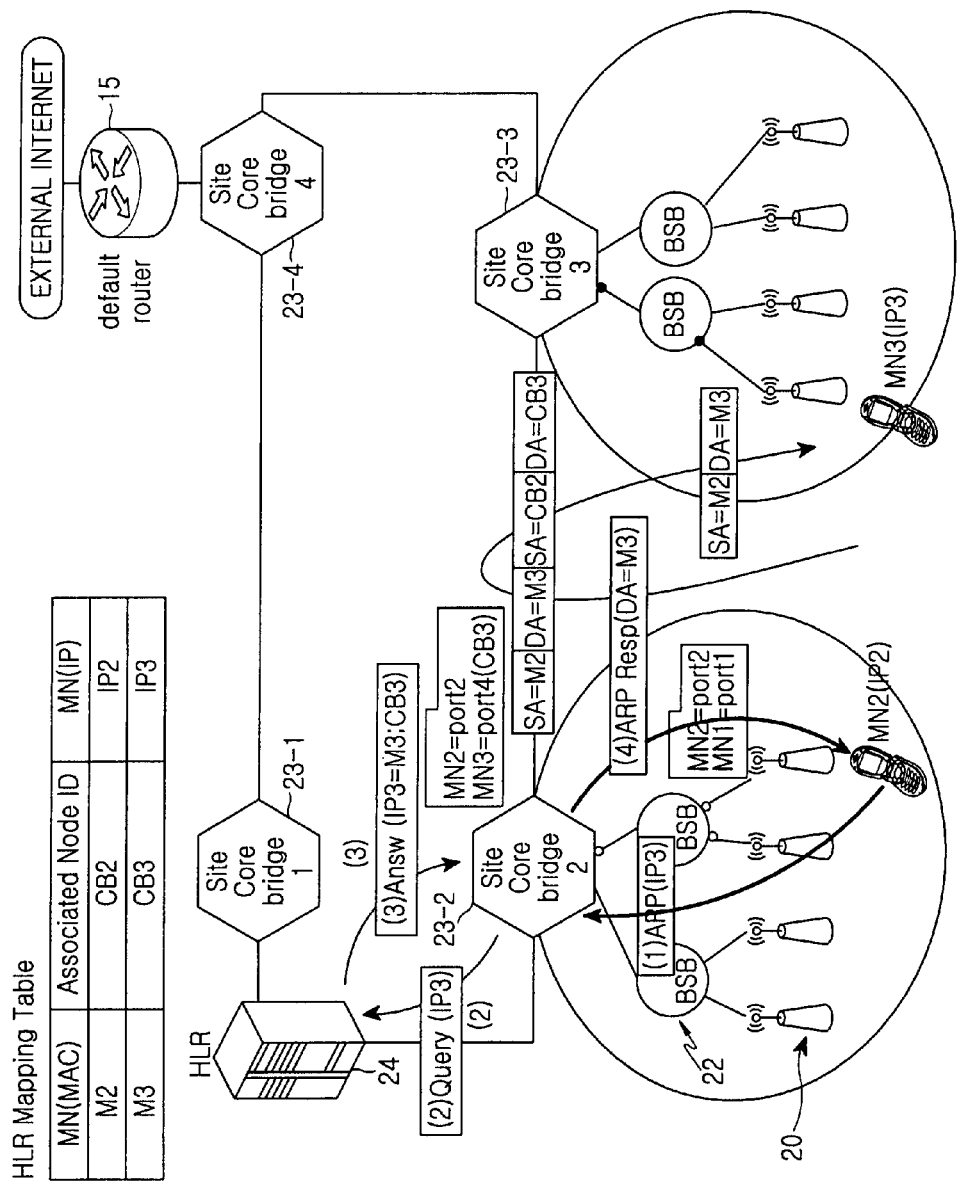
FIG. 5 illustrates a procedure for communicating between MNs in different sites in the RAS backbone network illustrated in FIG. 2.

FIG. 5 illustrates a procedure for communicating between MNs in different sites in the RAS backbone network illustrated in FIG. 2. Referring to FIG. 5, in relation to an ARP request about a peer MN (MN3 in FIG. 5) from an MN (MN2 in FIG. 5), the SCB 23-2 finds out the site (the SCB 23-3) where MN3 is located by querying the HLR 24 and receiving a response message from the HLR 24 in steps (1), (2) and (3) in the same manner as illustrated in FIG. 4. The response message contains the MAC address (M3) of MN3 and the MAC address (CB3) of the SCB 23-3 to which MN3 belongs.

In step (4), the SCB 23-2 writes the MAC address of MN3 and the information about the SCB 23-3 in its FDB and sends an ARP response message with the MAC address of MN3 to MN2.

A data frame sent from MN2 to MN3 is delivered from the SCB-23-2 to the SCB 23-3 by MAC-in-MAC encapsulation in step (5). The SCB 23-3 detects the MAC-in-MAC encapsulated MAC frame of MN2 and relays it to MN3.

Specifically, the SCB 23-2 encapsulates the data frame in a MAC-in-MAC frame, sets the Destination Address (DA) of a MAC-in-MAC header to the MAC address of the SCB 23-3, and sets the Source Address (SA) of the MAC-in-MAC header to the MAC address of the SCB 23-2. Upon receipt of the MAC-in-MAC frame with its MAC address as an outer DA, the SCB 23-3 eliminates the outer MAC address by MAC-in-MAC decapsulation and sends the original MAC frame to MN3.

The MAC address of each MN is written in the FDB of each bridge (including the SCB) in a soft state with an age set. Therefore, a large size is not required for the FDB.

5. Communication to External Network

Figure 6:
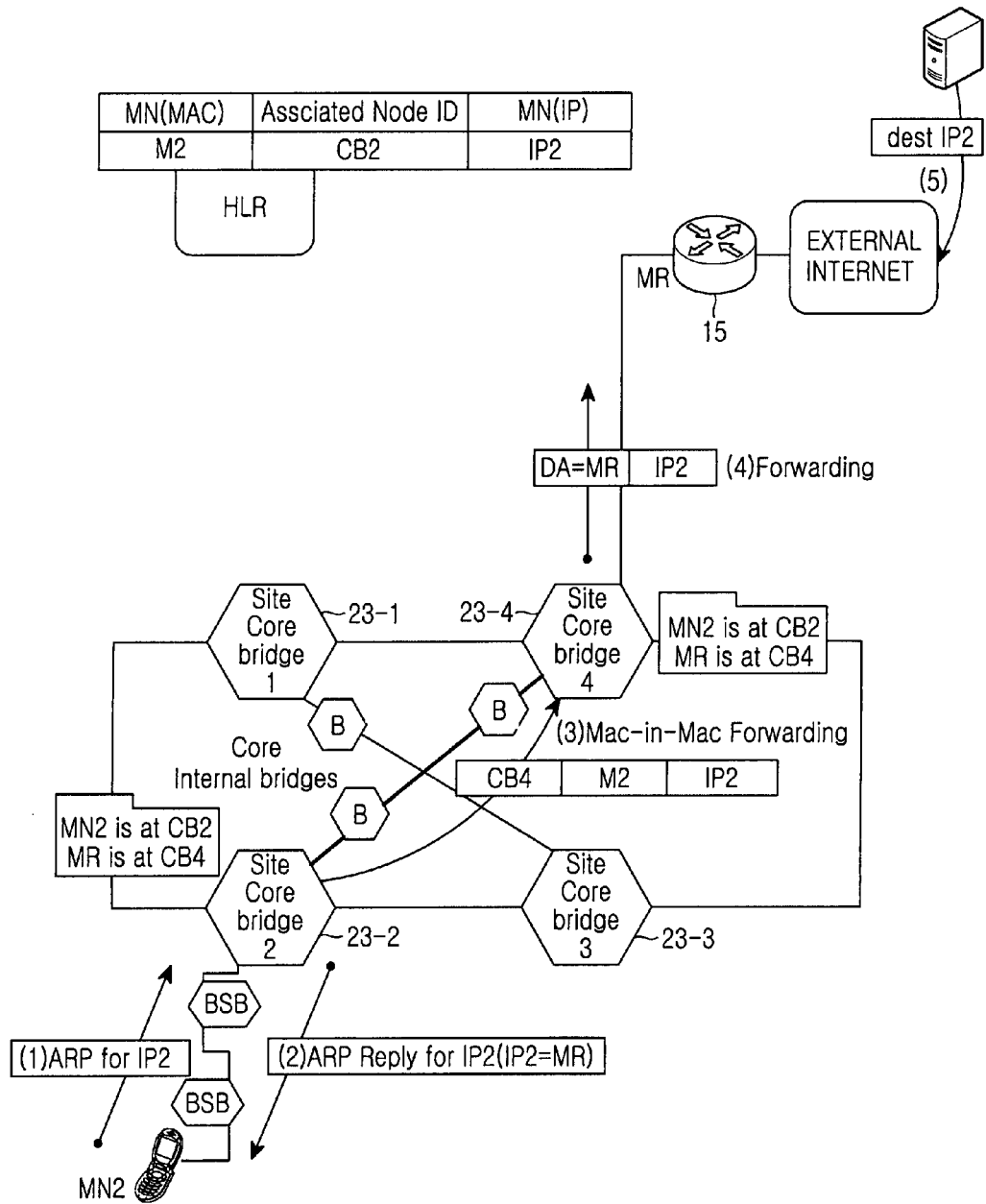
FIG. 6 illustrates a procedure for communicating from an MN within the RAS backbone network illustrated in FIG. 2 to an MN within an external network.

FIG. 6 illustrates a procedure for communicating from an MN within the RAS backbone network illustrated in FIG. 2 to an MN within an external network. Referring to FIG. 6, each MN tries to locate a destination MN in a similar manner to steps (1) to (4) illustrated in FIGS. 4 and 5. Since the destination MN is not registered in the HLR 24, the MN determines that the destination MN is located in another subnet (an external network).

Knowing that the destination MN is in a different subnet (an external network), the MN (MN2 herein in FIG. 6) sends an ARP request concerning the default router 15, for communications with the external network in step (1). The SCB 23-2 sends an ARP response with the already preserved information of the default router 15 to MN2, thus enabling MN2 to communicate with the external network in step (2). That is, the SCB 23-2 sends a data frame from MN2 in a MAC-in-MAC frame with a destination set to an SCB 23-4 connected to the default router 15 in step (3). In step (4), the SCB 23-4 forwards a MAC frame encapsulated in the MAC-in-MAC frame to the default router 15. Finally, the default router 15 sends the frame to the destination MN over the Internet in step (5).

6. Communication from External Network

Figure 7:
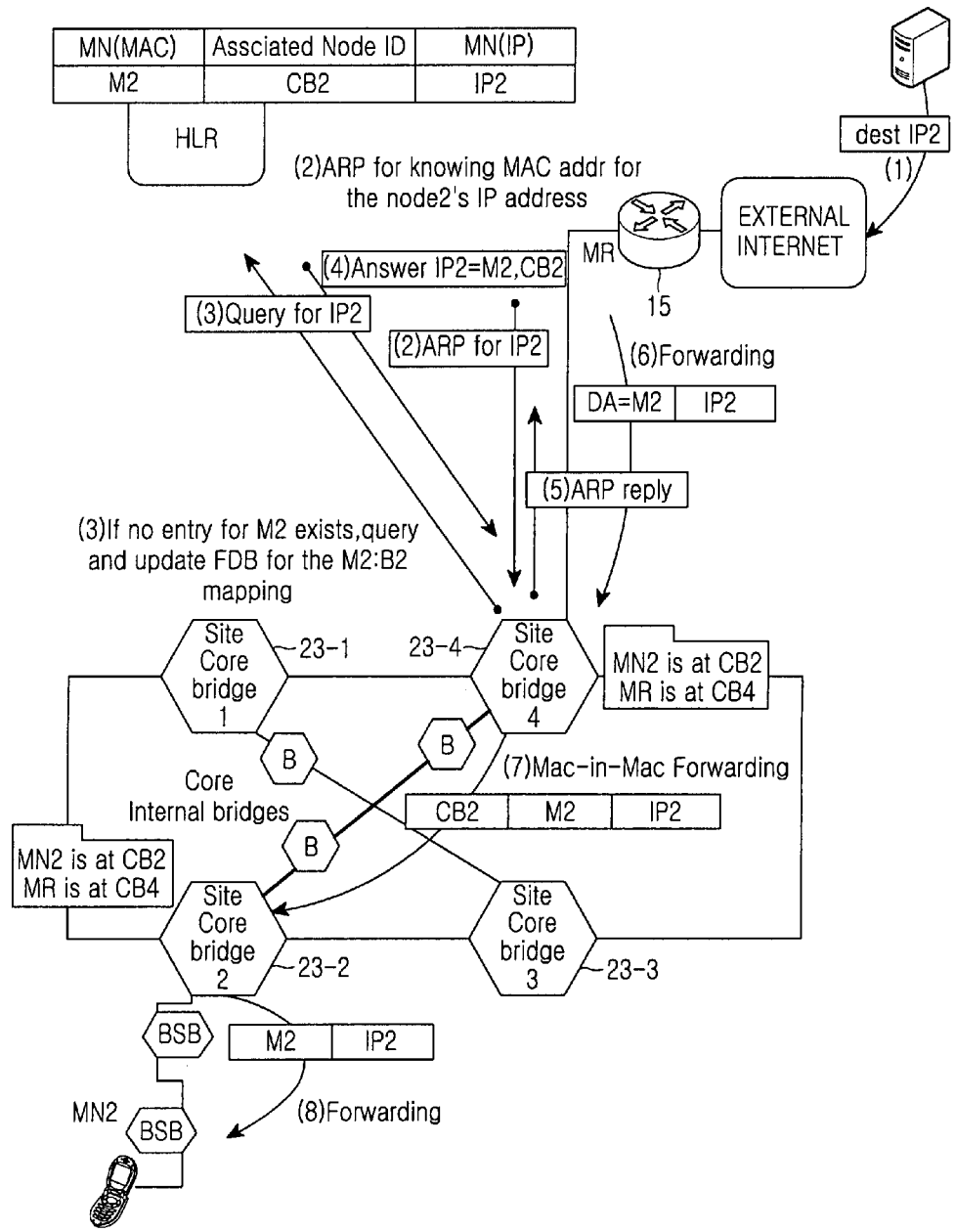
FIG. 7 illustrates a procedure for communicating from the MN within the external network to the MN within the RAS backbone network illustrated in FIG. 2.

FIG. 7 illustrates a procedure for communicating from the MN within the external network to the MN within the RAS backbone network illustrated in FIG. 2. Referring to FIG. 7, if an MN in the external network is to communicate with an MN (MN2 herein in FIG. 7) within the RAS backbone network, the external MN must locate the site of MN2. Hence, upon receipt of a request for communication to MN2 over the Internet in step (1), the default router 15 sends an ARP request for the IP address of MN2 to the SCB 23-4 connected to the default router 15 in step (2). In step (3), the SCB 23-4 queries the HLR 24 for the HP address of MN2 rather than broadcasts the ARP request of the default router 15 in the network. The SCB 24-4 receives a response message containing the MAC address (CB2) of the SCB 23-2 to which MN2 belongs and the MAC address (M2) of MN2 from the HLR 24 in step (4), writes the MAC addresses in its FDB, and sends an ARP response to the default router 15 in step (5).

The default router 15 acquires the MAC address of MN2 by the ARP response and thus normally sends an IP packet from the external MN to the SCB 23-4 in step (6). In step (7), the SCB 23-4 relays the frame in a MAC-in-MAC manner to the SCB 23-2 based on the already preserved MAC address of MN2 and the MAC address of the SCB 23-2. Thereafter, the SCB 23-2 forwards the frame to MN2 within the site in step (8).

As described above, in accordance with the bridge-based RAS backbone network system and the signal processing method therefor according to the present invention, a RAS backbone network is implemented using L2 Ethernet bridges and signals are efficiently processed. Therefore network management is facilitated, efficient and fast handover is enabled, and network efficiency is increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bridge-based Radio Access Station (RAS) backbone network, comprising:
    a plurality of Base Station Bridges (BSBs) having Layer 2 (L2) switches, in communication with a plurality of RASs;
    a plurality of Site Core Bridges (SCBs) having Layer 2 (L2) switches, connected to a part of the BSBs in a lower layer and forming a core network, each of said plurality of SCBs having information regarding Mobile Nodes (MNs) within their respective core network; and
    a Home Location Register (HLR) for managing a configuration information of network entities by storing Internet Protocol (IP) addresses and Media Access Control (MAC) addresses of the Mobile Nodes (MNs) within the backbone network and the addresses of SCBs to which the MNs belong in a table,
    wherein each of the SCBs:
        statically preserves the MAC address of a same external default router, for relaying an egress frame,
        statically registers the individual MAC address of the each SCB in other SCBs in the core network beforehand,
        detects a destination MN that an MN within a site of the each SCB wants to communicate with through the HLR,
        determines whether said destination MN is within its core network; and
        sends a frame to an SCB of a site to which the destination MN belongs or the MAC address of the external default router, when the destination MN is not within its core network.

2. The system of claim 1, wherein an MN within the site in the bridge-based RAS backbone network sends an Address Resolution Protocol (ARP) frame with the MAC address and IP address of the MN to an SCB to which the MN belongs through an associated BSB during an initial access, and the SCS sends the MAC address and IP address of the MN together with the MAC address of the SCB to the HLR so as to register the MAC address and IP address of the MN and the MAC address of the SCB in the HLR.

3. A signal processing method in a bridge-based Radio Access Station (RAS) backbone network having a plurality of Base Station Bridges (BSBs) with Layer 2 (L2) switches connected to a plurality of RASs, a plurality of Site Core Bridges (SCBs) with L2 switches, which form a core network and are statically aware of the locations of the SCBs in an entire network, and a Home Location Register (HLR) for managing configuration information of network entities, the Register including information regarding a same external default router to which each SCB is in communication with, the method comprising the steps of:
    sending an Address Resolution Protocol (ARP) frame with Mobile Node (MN) information including the Media Access Control (MAC) address and Internet Protocol (IP) address of the MN to an SCB to which the MN belongs through an associated BSB during an initial access to the network by the MN, so as to register the MN in a Filtering DataBase (FDB) of each bridge in an uplink path; and
    sending the MAC address and IP address of the MN together with the MAC address of the SCB to the HLR by the SCB so as to register a location information indicating the SCB to which the MN belongs and the MAC address and IP address of the MN in the HLR, wherein said SCB determines wherein a destination MN is registered with the SCB and sends a frame to an SCB of a site to which the destination MN belongs or the MAC address of the external default router, when the destination MN is not registered to the SCB.

4. A signal processing method in a bridge-based Radio Access Station (RAS) backbone network having a plurality of Base Station Bridges (BSBs) with Layer 2 (L2) switches, connected to a plurality of RASs, a plurality of Site Core Bridges (SCBs) with L2 switches, which form a core network and are statically aware of the locations of the SCBs in an entire network, and a Home Location Register (HLR) for managing configuration information of network entities, the Register including information regarding a same external default router to which each SCB is in communication with, the method comprising the steps of:

querying, upon receipt of an Address Resolution Protocol (ARP) frame requesting the address of a destination Mobile Node (MN) from an MN, the HLR for the address of the destination MN and acquiring the address of the destination MN by a response from the HLR by a first SCB to which the MN belongs;

sending an ARP response to the MN by the first SCB, if the first SCB determines from the address of the destination MN that the destination MN is located within a site of the first SCB, so that the MN acquires the Media Access Control (MAC) address of the destination MN; and communicating with the destination MN through selected ones of the Base Station Bridges (BSBs) within the site by the MN.

5. The signal processing method of claim 4, further comprising the steps of:

writing the MAC address of the destination MN and information about a second SCB to which the destination MN belongs in a bridging table of the first SCB by the first SCB, if the first SCB determines from the address of the destination MN that the destination MN is located in a different site from the site of the first SCB, sending an ARP response to the MN by the first SCB, so that the MN acquires the MAC address of the destination MN and the MAC address of the second SCB;

encapsulating a data frame directed to the destination MN, sent from the MN in a MAC-in-MAC frame, sending the MAC-in-MAC frame to the second SCB by the first SCB; and detecting a MAC frame destined to the destination MN from the MAC-in-MAC frame and relaying the MAC frame to the destination MN by the second SCB.

6. The signal processing method of claim 5, wherein the MAC address of an MN is written in a soft state with an age set in each bridge within the site.

7. The signal processing method of claim 4, further comprising the steps of:

notifying the MN that the destination MN is located in a different site from the site of the first SCB by sending an ARP response by the first SCB, if the first SCB determines from the address of the destination MN that the destination MN is located in the different site;

sending, upon receipt of an ARP request about a default router associated with the MN to communicate with an external network, an ARP response to the MN using preliminarily statically set information about the default router; and sending a data frame sent by the MN in a MAC-in-MAC frame with a destination set to a third SCB connected to the default router by the first SCB.

8. A signal processing method in a bridge-based Radio Access Station (RAS) backbone network having a plurality of Base Station Bridges (BSBs) with Layer 2 (L2) switches, connected to a plurality of RASs, a plurality of Site Core Bridges (SCBs) with L2 switches, which form a core network and are statically aware of the locations of the SCBs in an entire network, and a Home Location Register (HLR) for managing configuration information of network entities, the Register including information regarding a same external default router to which each SCB is in communication with, the method comprising the steps of:

querying, upon receipt of an Address Resolution Protocol (ARP) request about a destination Mobile Node (MN) within the network from an external router, the HLR for the Media Access Control (MAC) address of a first SCB to which the destination MN belongs and the MAC address of the destination MN, receiving the MAC address of the first SCB and the MAC address of the destination MN from the HLR, storing the MAC address of the first SCB and the MAC address of the destination MN, and responsive to a determination that the MN is not located within the backbone network:

sending an ARP response to the external router by a second SCB connected to an external network, relaying an Internet Protocol (IP) packet to the second SCB according to the ARP response by the external router; and relaying the IP packet in a MAC-in-MAC frame based on the stored MAC address of the destination MN and the MAC address of the first SCB to the destination MN via the first SCB through the second SCB.

\* \* \* \* \*